US012792389B2

(12) United States Patent
Agarwal et al.

(10) Patent No.: US 12,792,389 B2
(45) Date of Patent: Nov. 10, 2026

(54) GENERATING ACTIONS IN A COMPUTING NETWORK USING AN AI AGENT

(71) Applicant: MICROSOFT TECHNOLOGY LICENSING, LLC, Redmond, WA (US)

(72) Inventors: Sharad Agarwal, Seattle, WA (US); Pedro Henrique Bragioni Las Casas, Belo Horizonte (BR); Alok Gautam Kumbhare, Sammamish, WA (US); Rodrigo Lopes Cancado Fonseca, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 285 days.

(21) Appl. No.: 18/772,077

(22) Filed: Jul. 12, 2024

(65) Prior Publication Data

US 2026/0017079 A1 Jan. 15, 2026

(51) Int. Cl.
*G06F 9/455* (2018.01)

(52) U.S. Cl.
CPC .................... *G06F 9/45558* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 7,567,968 | B2 * | 7/2009 | Desai | G06F 16/2452 |
| 11,861,352 | B2 * | 1/2024 | Baral | G06N 20/00 |
| 12,155,700 | B1 * | 11/2024 | McCord | H04L 65/1096 |
| 12,298,975 | B2 * | 5/2025 | Baldua | G06F 16/2425 |
| 12,354,072 | B2 * | 7/2025 | Cella | B22F 10/85 |
| 12,381,876 | B2 * | 8/2025 | Jeffords | G06F 21/604 |
| 12,609,960 | B2 * | 4/2026 | Ahmad | G06F 21/554 |

* cited by examiner

*Primary Examiner* — Van H Nguyen
(74) *Attorney, Agent, or Firm* — Han Gim; Newport IP, LLC

(57) ABSTRACT

A computing system receives an indication of an operational procedure to be performed in the computing network. The operational procedure is represented as a structured operator-readable document comprising operator-executable operations for resolving an issue in the computing network or implementing a modification to the computing network. Content from the operational procedure is input to an artificial intelligence (AI) agent to generate a plan for executing the operational procedure in the computing network. The plan includes a plurality of operations and at least one network tool for executing the operations. The generated plan is verified to meet one or more predetermined criteria.

20 Claims, 11 Drawing Sheets

GENERATING ACTIONS IN A COMPUTING NETWORK USING AN AI AGENT

BACKGROUND

A cloud network providing mobile communications services can have thousands or millions of nodes such as servers and other devices running various networking functions. The nodes and networking functions collectively need to operate reliably in order to provide high-performance services. It is therefore important to provide an effective mechanism to efficiently make updates and changes. It is also important to detect anomalies early, take corrective action, and track each node and network function over its lifecycle to maintain network health and avoid downtime. In a cloud-based system (e.g., one or more data centers) that includes thousands or millions of nodes, the inability to maintain node and function health and serviceability can have consequences such as processing delays and increased costs, which otherwise can lead to revenue loss and customer dissatisfaction.

It is with respect to these considerations and others that the disclosure made herein is presented.

SUMMARY

Operators of cloud networks rely upon documentation to maintain and service their networks. For example, to reduce the time to mitigation (TTM) of incidents, it is common practice for on-call engineers for cloud networks to rely on technical, human readable documents such as troubleshooting guides (TSGs), Methods of Procedure (MOPs), play books, run books, and the like, which are documents that detail steps to identify causes and address the symptoms of an incident or implement some process or procedure in the network. While it is possible to automate troubleshooting by prompting a large language model (LLM) to solve a particular incident using a document, this may not produce reliable results due to inconsistent document quality (e.g., imprecise language, assumed or "tribal" knowledge, poorly specified tools, inconsistent or missing inputs and outputs to various steps, and outdated information). Additionally, LLMs can generate variable outputs and are prone to hallucinations. While a co-pilot or a chat-based approach may mitigate this issue, TTM would remain limited. Lastly, the cost of LLM calls can significantly increase based on the number of incidents.

Methods and systems are disclosed for improving the efficiency of cloud network operators by automating the execution of documentation such as TSGs. In an embodiment, AI agents are used to produce executable plans from a source document. Instead of having the AI agent read and attempt to execute the document at the time of an incident, the AI agent is used in a planning phase where, in an iterative fashion, the AI agent enables the document and its associated executable plan to be improved.

In an embodiment, information is obtained from the document such that the document can be converted into a precise, executable plan. In one embodiment, the plan is represented as a flowchart, with nodes representing tasks (e.g., "obtain the IP address of the failed network interface"), and edges representing execution flow and data flow between tasks. In some embodiments, execution of the plan can be performed without an AI agent, as tasks can be represented in sequences with branching instructions. In other embodiments, the execution of the plan can be performed using an AI agent. The tasks can include a combination of existing tools (e.g., shell scripts), non-planning LLM tasks (e.g., extracting an identifier from a log), or an operator action, such as replacing a network interface.

The disclosed embodiments provide improvements over conventional techniques by enabling improved utilization of documents and processes such as TSGs for operator and automatic execution. Additionally, by front-loading the use of models such as LLMs, the cost of using LLMs is reduced and the impact of hallucinations and non-deterministic execution is reduced.

This Summary is not intended to limit the scope of the claimed subject matter. Furthermore, the claimed subject matter is not limited to implementations that solve any or all disadvantages noted in any part of this disclosure.

DESCRIPTION OF DRAWINGS

The Detailed Description is described with reference to the accompanying FIGS. In the FIGS., the left-most digit(s) of a reference number identifies the FIG. in which the reference number first appears. The same reference numbers in different FIGS. indicate similar or identical items.

DETAILED DESCRIPTION

Figure 1A:
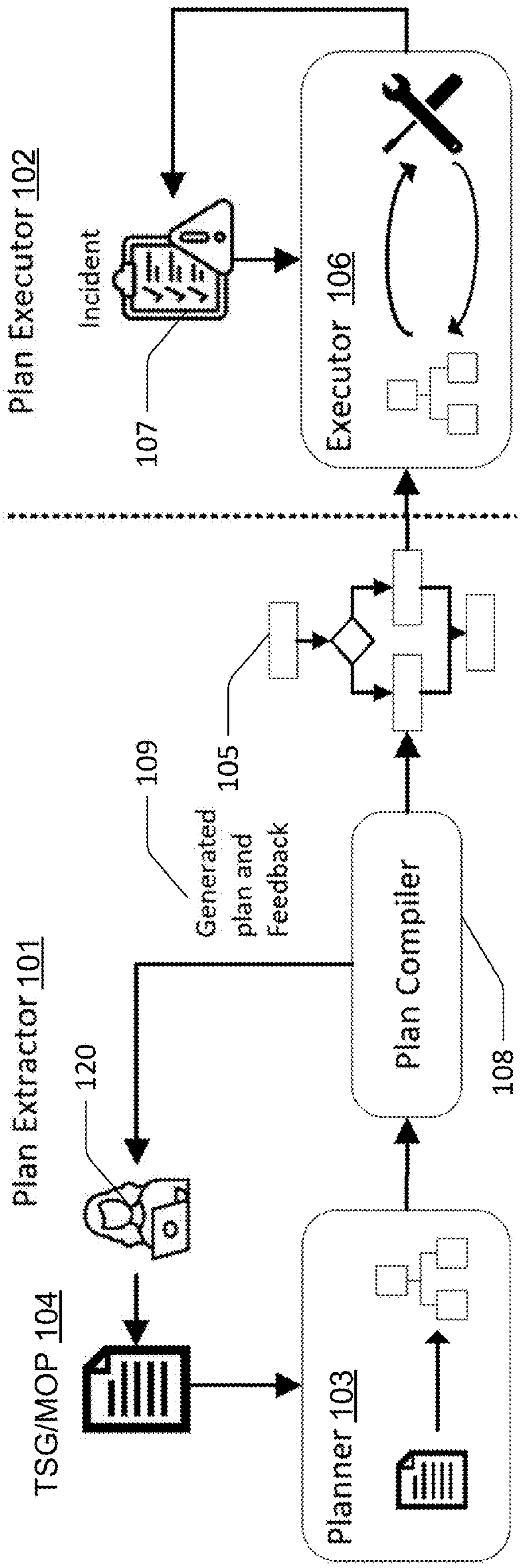
FIGS. 1A through 1C are diagrams illustrating the disclosed techniques according to one embodiment disclosed herein.

A cloud network providing cloud services can have thousands or millions of nodes such as servers and other devices running various networking functions. The nodes and networking functions collectively need to operate reliably in order to provide high-performance services. The inability to maintain node health and serviceability can have consequences such as processing delays, increased costs, and frustrated customers.

The present disclosure describes methods and systems for improving the efficiency of cloud network operators by automating the execution of documents containing processes and procedures such as TSGs. In an embodiment, AI agents are used to generate executable plans from a source document. In one embodiment, the AI agent is used in a planning phase where, in an iterative fashion, the AI agent facilitates the generation and update of the document. The plan for the document can be generated at the time that the document is available, updated, or in response to a request. Thus the plan for the document can be available for execution instead of having the AI agent read and attempt to execute the document at the time of an incident. In an embodiment, materials and data from a knowledge base can be used that includes incident reports and other sources to provide intelligent and accurate plans.

The present disclosure also describes methods and systems for improving the efficiency of cloud network operators by automating the execution of documents. In an embodiment, AI agents are used to confirm that the output of each operation of the flow graph was correctly executed and meets criteria prior to proceeding to the next operation. The disclosed embodiments provide improvements over conventional techniques by enabling efficient and accurate execution of documents without the need for operator action, thereby reducing the cost of process execution.

Referring to the appended drawings, in which like numerals represent like elements throughout the several FIGURES, aspects of various technologies for generating and using prompts will be described. In the following detailed description, references are made to the accompanying drawings that form a part hereof, and which are shown by way of illustration specific configurations or examples.

In many cloud computing (e.g., software-as-a-service (SaaS)) contexts, when an outage or performance regression occurs in a production system, an incident is generated and registered. In an incident management system, there are generally two common types of incidents: human-generated incidents, which are reported by an operator or user, and machine-generated incidents, which are created by automatic monitors that detect one or more metrics violating specified thresholds.

A troubleshooting guide (TSG) is an example of a human-readable document that can be used by an operator to investigate and resolve an incident. For example, the TSG can be a structured document that provides systematic procedures for identifying, diagnosing, and resolving issues within the network. The TSG typically includes multiple operations, some of which may require executing commands (such as retrieving logs), and some of which may depend on the result of a previous step (such as selecting an investigative path based on results of a step). A TSG is typically generated when repeated occurrences of a problem are observed. However, TSGs can be lengthy, requiring significant time for an operator to mitigate incidents. Additionally, TSGs may be frequently updated.

Additionally, a variety of changes and updates can be made to various portions of a cloud computing network, such as software updates and configuration changes. A method of operation (MOP) is a detailed written procedure for completing complex equipment, network, or circuit configurations. MOPs are also used to test and verify system functionality and performance after changes are implemented. A MOP can include general descriptions, terminal commands, browser tasks, and logic to determine the next action. Execution of MOPs involves following complex instructions which can be highly detailed. While it is possible to use a foundation model to create an execution plan based on user intent or execute OS-level tasks, it is nevertheless difficult to generate accurate execution plans for MOPs.

FIG. 1A illustrates a high-level overview of the disclosed embodiments. In an embodiment, a plan extractor component 101 and a plan executor component 102 are described. In one embodiment, planner 103 is an LLM-based AI agent that analyzes a document such as a TSG or MP document 104 and generates an executable plan. In an embodiment, this process is triggered when a document is created or modified. The process can also be triggered based on an operator or system input or command. The input is the document 104 and a set of tools available to execute the plan. The executor 106 then executes the plan 105 produced by the planner 103 against an incident 107 or other event.

The executor 106 can be activated when a new incident 107 occurs or when a procedure is to be implemented. The executor 106 accesses the plan relevant to the incident or procedure, and retrieves the required information from the incident and follows the steps described in the plan, takes the required actions, executes the defined tools, and makes decisions until the investigation or mitigation of the incident is complete. The executor 106 annotates the incident log with actions taken and decisions made, which allows for post-incident auditing.

Figure 1B:
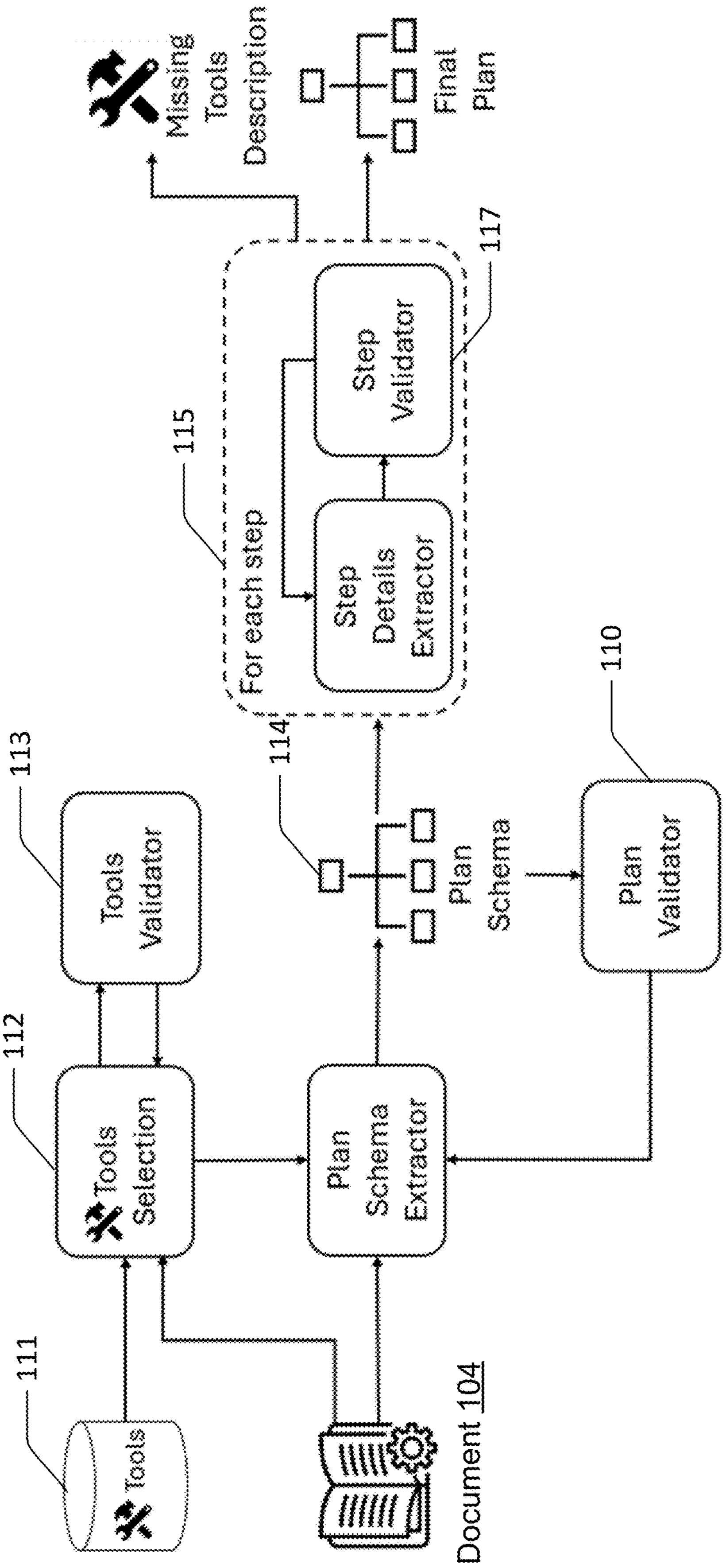

Referring to FIG. 1B, the disclosed embodiments include a plan validator 110 that is configured to determine that the generated plan is complete and executable. In an embodiment, execution plans are generated at the time of document creation or update, rather than in response to an incident. This allows for reduction of LLM usage cost by generating a plan for a document once, instead of each time that a relevant incident occurs. Additionally, MTTM is reduced through the use of a pre-generated plan when addressing an incident.

In an embodiment, plans are iteratively generated. The planner 103 provides a high-level plan, and subsequently adds details of each step in the plan, such as what tool to use or what inference to make. This allows for a more detailed plan while limiting LLM hallucinations. In an embodiment, plans are generated to use existing, specific tools 111 that are available in the network. Examples of such tools 111 include tools for log retrieval or for rebooting a host. Access to existing, specific tools enables reduction of LLM usage cost by not requiring an LLM to manipulate secure shell (SSH) sessions to perform such actions, as well as reduction in the scope for hallucinations by using deterministic tools. Actions for which tools do not exist can be performed by an LLM, which may include analysis of a tool output that an engineer would otherwise perform.

To improve the quality of the plan, with reference to FIG. 1A, the planner 103 can be executed in iterations that include an operator 120. Within each iteration, the planner 103 uses multi-step plan generation which defines the necessary steps for the plan and the details required for execution of each step. After each round, operator 120 can update the document 104 based on the generated plan and feedback 109 from the planner 103. This process enables generation of a comprehensive executable plan as well as improvement of the quality of the document.

In some embodiments, the plan is represented as a flowchart 105 as shown in FIG. 1A. The plan can be a directed graph where each node represents a step, and solid edges represent the flow of execution. The plan can include data flow edges that represent the flow of data between steps. The plan can comprise three different types of steps: action, conditions, and events.

Action steps can include the execution of a tool and can be followed by a next step. In an embodiment, each node can have an associated tool and receive the required parameters (e.g., incident ID, incident details). Condition steps determine the investigation path to follow based on a decision. This step can include two or more next steps, each with an expression that is evaluated for plan execution to proceed along the path.

In an embodiment, event steps can include two different types: external actions and timer. For external actions, the step waits for a manual action or the receipt of a message before the plan is resumed, while timer events pause for a specified time before the event continues execution.

When extracting the details for each step, the planner 103 defines the tool 111 that will be used for its execution as well as the inputs and outputs of that step. In an embodiment, there can be two types of tools: (i) script tools and (ii) semantic tools. Script tools can include conventional programs that can be executed without the need for a language model. These tools can include a range of functionalities, including Python scripts, PowerShell scripts, Azure commands, and Log queries. Script tools can be executed directly by the system without the need for additional interpretation.

Script tools can further be categorized into two types: (a) retrieval tools that are used to fetch data from external sources, and (b) action tools that are used to perform actions on the system. Semantic tools utilize the understanding and generation capabilities of large language models. Semantic tools can include a variety of tasks from natural language processing to complex reasoning and inference. For example, semantic tools can analyze the output from script tools and extract relevant information from logs or help make routing decisions. Semantic tools can execute tasks that involve ambiguity, context sensitivity, or require a deeper understanding of language semantics.

In an embodiment, the executor 106 is triggered when a new incident is detected. In response, the plan related to the incident is retrieved. The executor 106 follows each step described in the plan. In an embodiment, the plan extracts a deterministic set of steps to investigate and mitigate the incident. The executor 106 further performs infrastructure and authentication aspects. For example, tools such as Powershell scripts, Kusto queries, and Python scripts require different resources, which are managed by the executor 106.

In an embodiment, the executor 106 runs semantic tools for steps that require reasoning or understanding of the context. This avoids the need for tasks that would have otherwise required operator intervention and action. In an embodiment, the executor 106 uses an AI model such as a large language model to perform these tasks. This allows the system to handle a wide range of tasks that would otherwise require operator intervention. In an embodiment, the use of LLMs is limited within a given step and not used across steps to ensure that the executor remains deterministic.

In some embodiments, the executor 106 is configured to be stateful and to pause and resume execution at a later time as some incident mitigations may require manual intervention (i.e., external events) or require an extended time to mitigate. In an embodiment, this can be implemented using stateful functions in a serverless environment such as Durable Functions in Azure.

FIG. 1B further illustrates the described iterative plan generation process. A tool selection component 112 is used to select the tools that are required during the execution of the plan. A given document 104 is analyzed, and a set of available tools 111 is analyzed to determine which tools are relevant. The tool selection component 112 is facilitated by a prompt that provides the LLM with context to analyze the document 104 and the tools 111. Various prompting techniques such as chain-of-thought may be used to guide the LLM in selecting the tools.

The prompt guides the LLM's analysis of the document 104 and associated tools 111. Based on this semantic understanding, the prompt maps tools 111 that are relevant to the tasks proposed in the document 104. In one embodiment, a JSON object is generated that is parsed by the planner 103 and stored for downstream use. In an embodiment, the description for each tool includes the following details.

Descriptive Name
  Detailed description of tool and what is its purpose
  Input Parameters
    Parameter name
    Detailed description of the parameter
    If parameter is required
  Outputs
    Output name
    Detailed description of the output Following tool selection, a validation step is run by a tools validator 113 to ensure that the selected tools are appropriate. The validation step can reduce hallucinations from the large language models. The validation step checks the selected tools and confirms the completeness and correctness of the tool list. In an embodiment, a flag is returned indicating the validity of the response from the tool selector component 112. If the response is invalid, the reasons for the failure and potential fixes are provided. The validation component 110 is then re-executed with this additional context, continuing until a valid response is generated or an execution limit is reached. The feedback can then be provided for further review and providing corrections to the document 104.

After selecting tools 111 for executing the document 104, the plan is generated. In an embodiment, a high-level plan schema 114 is constructed, outlining the plan's structure with nodes and their relationships. Detailed steps, including tool mapping and inputs, are defined. This process can be iterative, using the LLM to generate and validate the plan until a comprehensive version is generated.

In the initial part of the prompt, the LLM is provided with the plan's structure and characteristics to ensure that the generated response aligns with specifications for an executable plan. This provides context for the prompt. Additionally, instructions for extracting the plan from the document 104 are specified. These instructions provide input to the LLM regarding how the document 104 addresses the incident and extracts self-contained steps covering possible paths for investigation and mitigation.

This initial version of the plan includes the description of each step, the type of step (action, condition or event), and subsequent steps. For conditional steps, each of the condition expressions are also defined for determining the execution after evaluating the condition. Following the plan schema generation, a validation step determines that the specifications of the plan are correctly followed. For example, action nodes should have only one next step, and condition steps should have a valid expression for each next step. Additionally, the validation step ensures that the plan is complete, follows the possible paths described in the document 104, and ensures that each step is self-sufficient and can be executed.

Similar to the previous process, the validation and update operations are repeated until a valid response is received or no further updates can be made from available information, in which case a set of feedback is provided so that the document 104 can be updated. In an embodiment, for each re-execution, the previous plan, the reasons why it was rejected, and possible fixes are provided as context to the plan schema extractor.

With the high-level plan schema 114, details are extracted for each step within the plan. The details can include which tool to use for executing the step, identifying the inputs required for the step and their sources (whether from a previous step, the incident, or pre-defined values from the document), and outputs of the step. The process of extracting the details includes providing the document, the list of available tools for executing the step, the high-level description of the step extracted by the previous component, and the path of the plan up to the current step.

With this information, the LLM can be directed to determine the requirements of each step, evaluate available tools, and select the most relevant tool. In cases where a relevant tool cannot be retrieved from the provided list, the LLM is instructed to propose a new tool for use in that step. The LLM can suggest both script-based tools and semantic tools. When proposing a new tool, the LLM describes the tool's purpose, provides the list of inputs and outputs, and for semantic tools, the LLM provides the required prompt.

The details generated for each step can also be validated 117. During validation, the relevance of the selected tool for the step is verified and it is ensured that the inputs can be sourced from previous steps, the incident, or from predefined values. This validation ensures that the plan is deterministically executable.

The validation component 115 can be utilized in other components of the planner. The purpose of the validation component 115 is to ensure that responses generated by each component are consistent with expected goals. Embodiments can include analysis and correction that instructs the LLM how to validate a given response against a set of goals. The validation component 115 takes as input the response being validated and the specific set of goals for that validation, as well as any additional context or other information. For example, to validate a plan generated by plan schema extractor, the goals would be to ensure that all steps are self-contained and that the plan is complete. The validation component 115 takes as input the original document, the goals of the planner, the response generated by the plan schema extractor, and the output of the plan compiler, which is a set of predefined rules, as the context that guides the validation and self-correction.

Figure 1C:
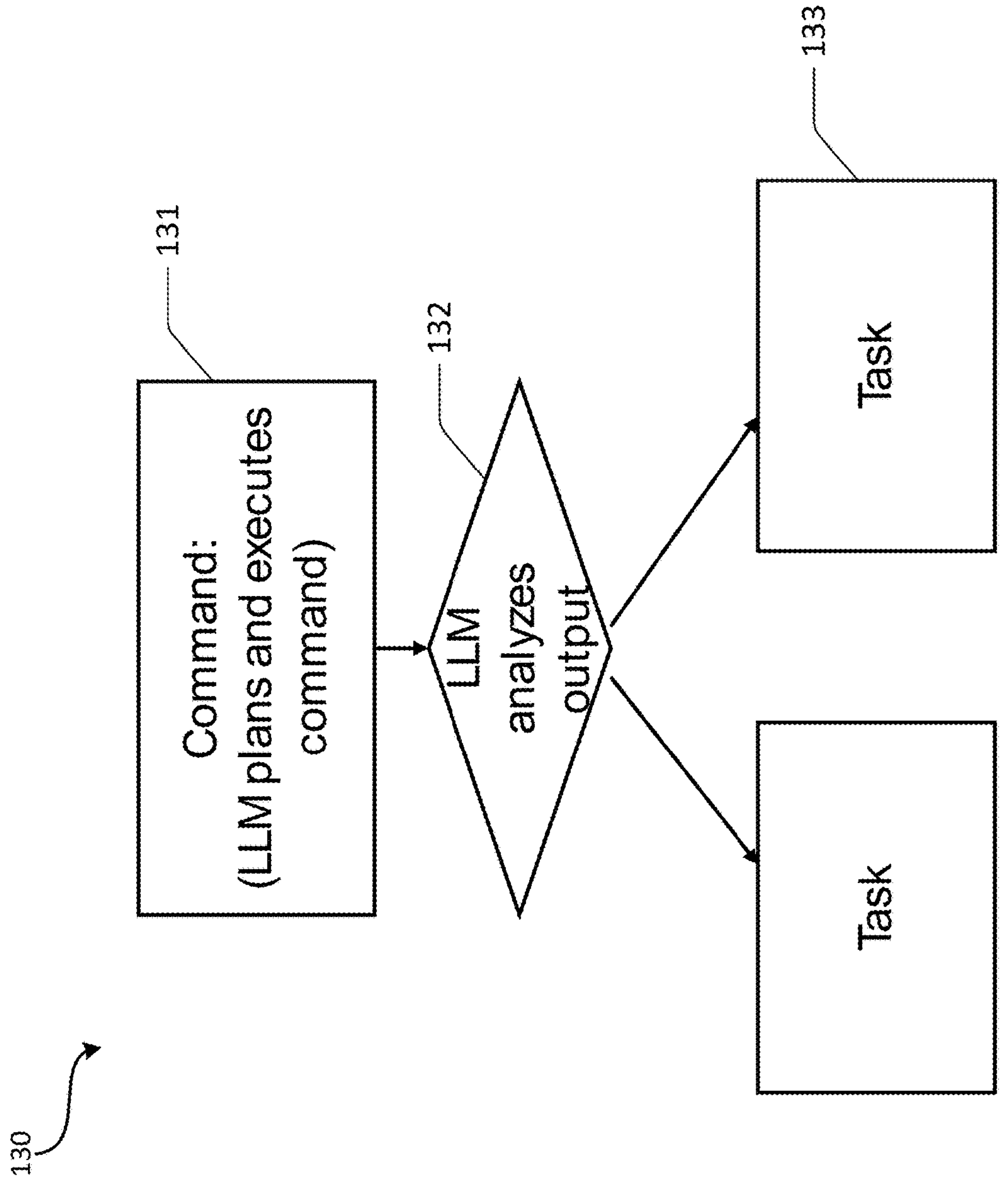

The above-described process can be applied to execution of various documents implemented in a cloud network including TSGs, MOPs, play books, and run books. A flow graph such as the example shown in FIG. 1C can be generated for a document. The example in FIG. 1C illustrates a simple flow graph with four nodes for the sake of clarity, but it should be understood that the flow graph can include multiple nodes and branches. Each node of the flow graph can be independent actions/executions. In an embodiment, an AI agent can be used to execute each part of the flow graph. The AI agent can plan and execute a command 131 in the flow graph 130. The AI agent can analyze 132 the output of the command 131. Based on analysis of the output, the AI agent can take different subsequent actions such as one of tasks 133. The tasks can include terminal commands or commands that are executable by a system in the network, browser tasks, and logical expressions. Verification can be performed, such as verifying that a prior command has been completed, and optionally in accordance with one or more criteria. For example, the verification can be "confirm that the output is in the range between X and Y."

Figure 2A:
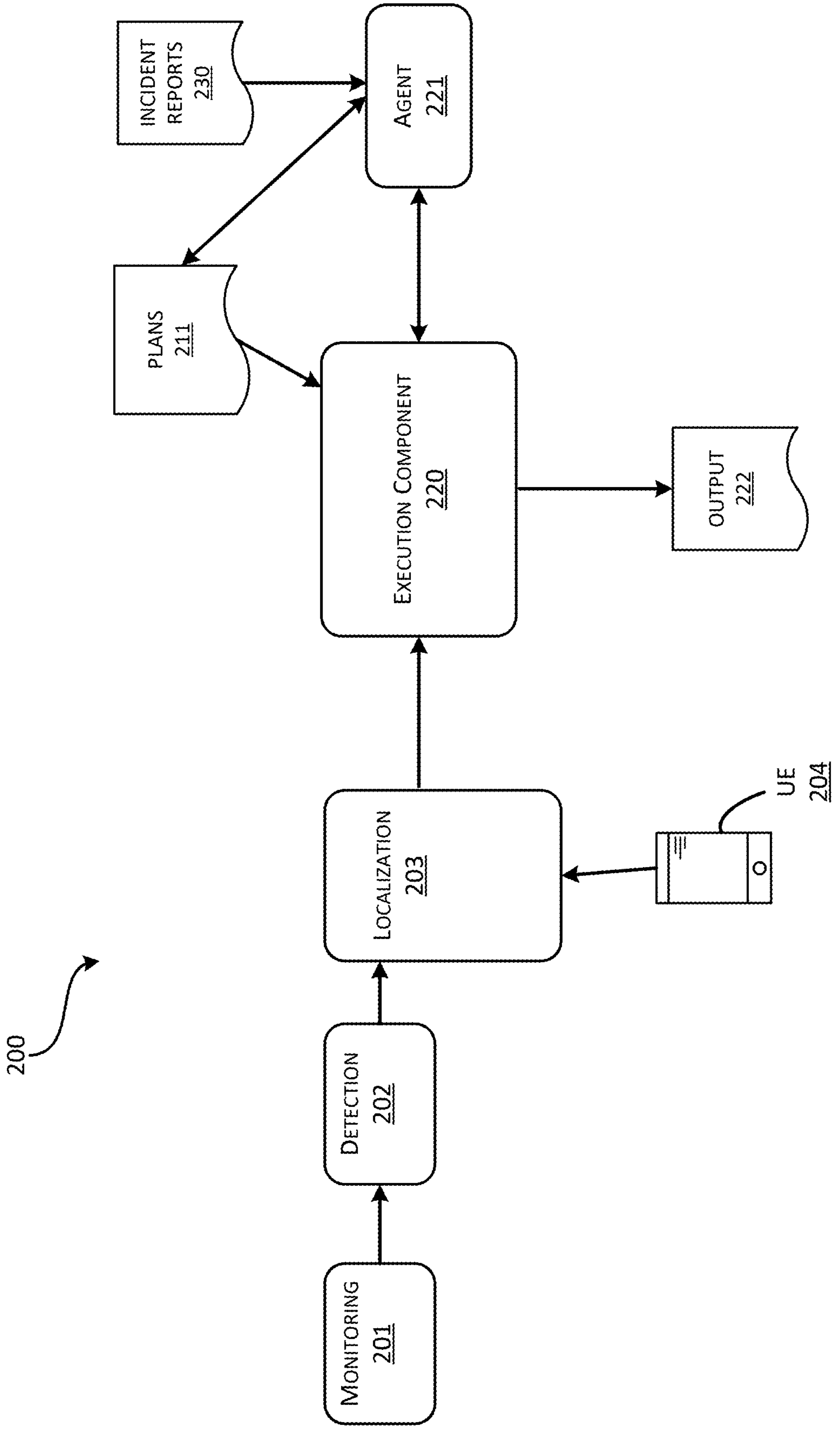
FIGS. 2A and 2B are diagrams illustrating an example architecture according to one embodiment disclosed herein.

FIG. 2A illustrates an example system 200 illustrating the disclosed embodiments. Monitoring 201 can include, for example, event data records (EDRs) from various network elements, such as for performance indicators for packet retransmission, throughput, latency, etc. Various kinds of anomalies can be detected 202 and alerts generated as disclosed herein. For example, if the latency suddenly increases above a specified threshold, an incident report 230 may be generated. Additional augmentation can be performed such as fault localization 203, for example in network segments, which enables narrowing the focus to a cell, site, gateway, region, or an appropriate level of localization. Additional information can include user complaints that can be associated with UE 204 that may identify an issue. Localization can include focusing on relevant sections for context generation.

Based on the detected anomaly, a data store can be accessed to identify an associated executable plan 211 for responding to the detected anomaly. The executable plans 211 are generated by a large language model (LLM) agent 221 based on a structured operator-readable document comprising operator-executable procedures for resolving the anomaly. The executable plan comprises a series of operations that are executable by an execution component 220. The executable plan can be executed using the execution component. In some embodiments, an output report 222 can be provided.

Figure 2B:
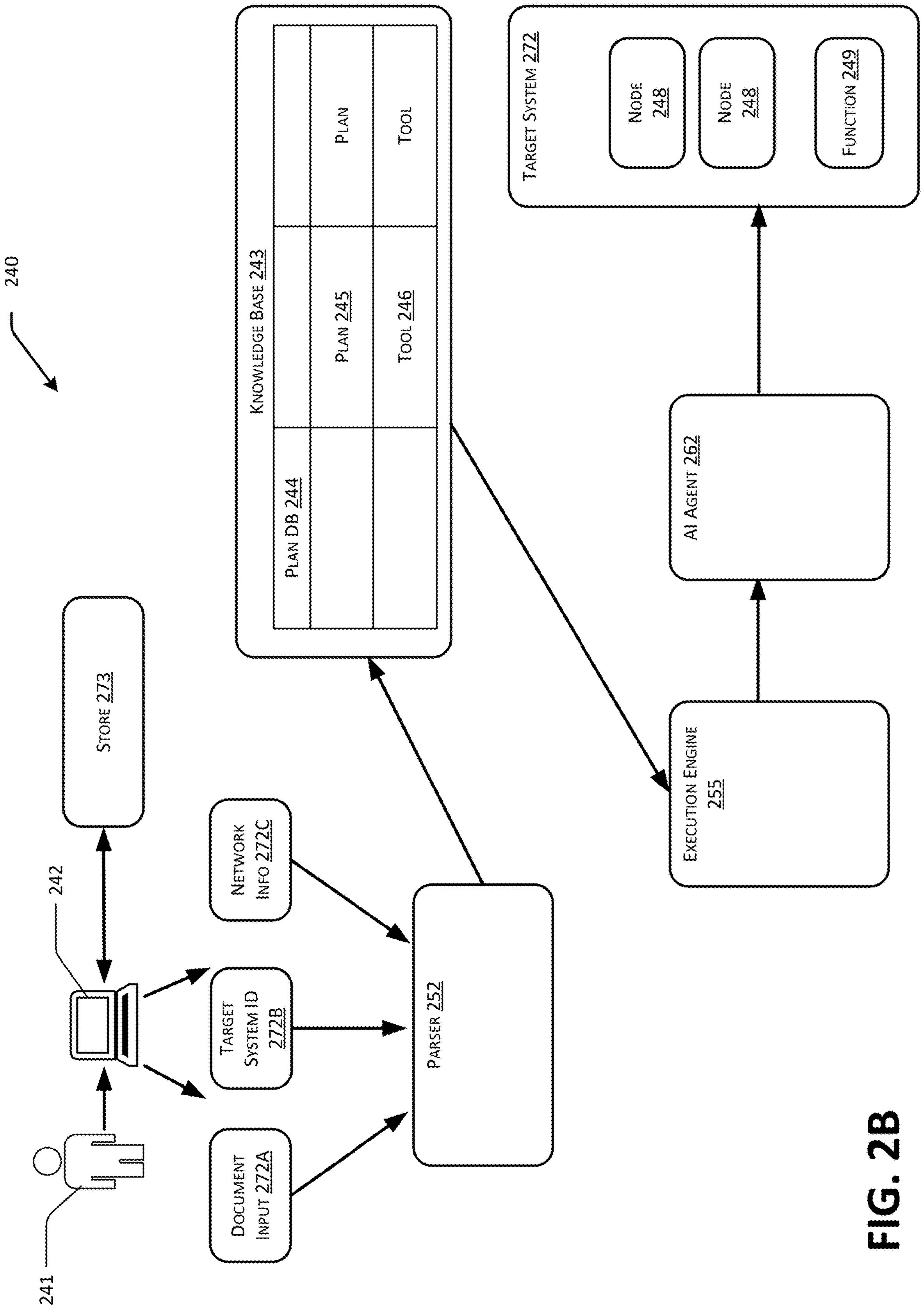

With reference to FIG. 2B, a document/plan execution framework 240 is configured to generate a plan 245 that executes a document from document/plan database 244 implementing a process, for example, at virtual function 249 implemented in a virtualized computing environment executing a plurality of virtual machines or containers. The document/plan execution framework 240 is configured to receive a document input 272A which is an identifier for a document to be performed with respect to the virtual function 249 in node 248 configured to operate on a target system 272. The document/plan execution framework 240 is also configured to receive indication of a target system identifier or name 272B and network information 272C. A store 273 of document inputs 272A, target system 272B, and network information 272C is optionally available. An operator 241 can enter information via computer 242. A parser 252 is configured to identify the type of data being passed in and parses the data into a standardized format that can be used to search the knowledge base 243.

The document/plan execution framework 240 is configured to execute execution engine 255. The execution engine 255 is configured to output a plan 245 to AI agent 262. The AI agent 262 is prompted to execute plan 245 at target system 272.

In one embodiment, document/plan execution framework 240 includes functionality that implements a data-driven model that uses knowledge base 243 based on plans 245, tools 246, and other information. The knowledge base 243 can include a document database 244 which can include one or more tables or other data structures.

The executable plans 245 are generated by AI agent 262 based on various documents that are structured operator-readable documents comprising operator-executable procedures for performing the operational procedure. The executable plans 245 comprise a series of operations that are executable by the AI agent 262. The AI agent 262 runs the first operation of the executable plan. The AI agent 262 verifies that the first operation meets a criterion for completion of the first operation. The AI agent 262 runs remaining operations of the series of operations and verifies that the remaining operations meet respective criteria for completion of the remaining operations. The document/plan execution framework 240 performs a remedial action in response to a failure of any of the operations to meet associated criteria.

Figure 3:
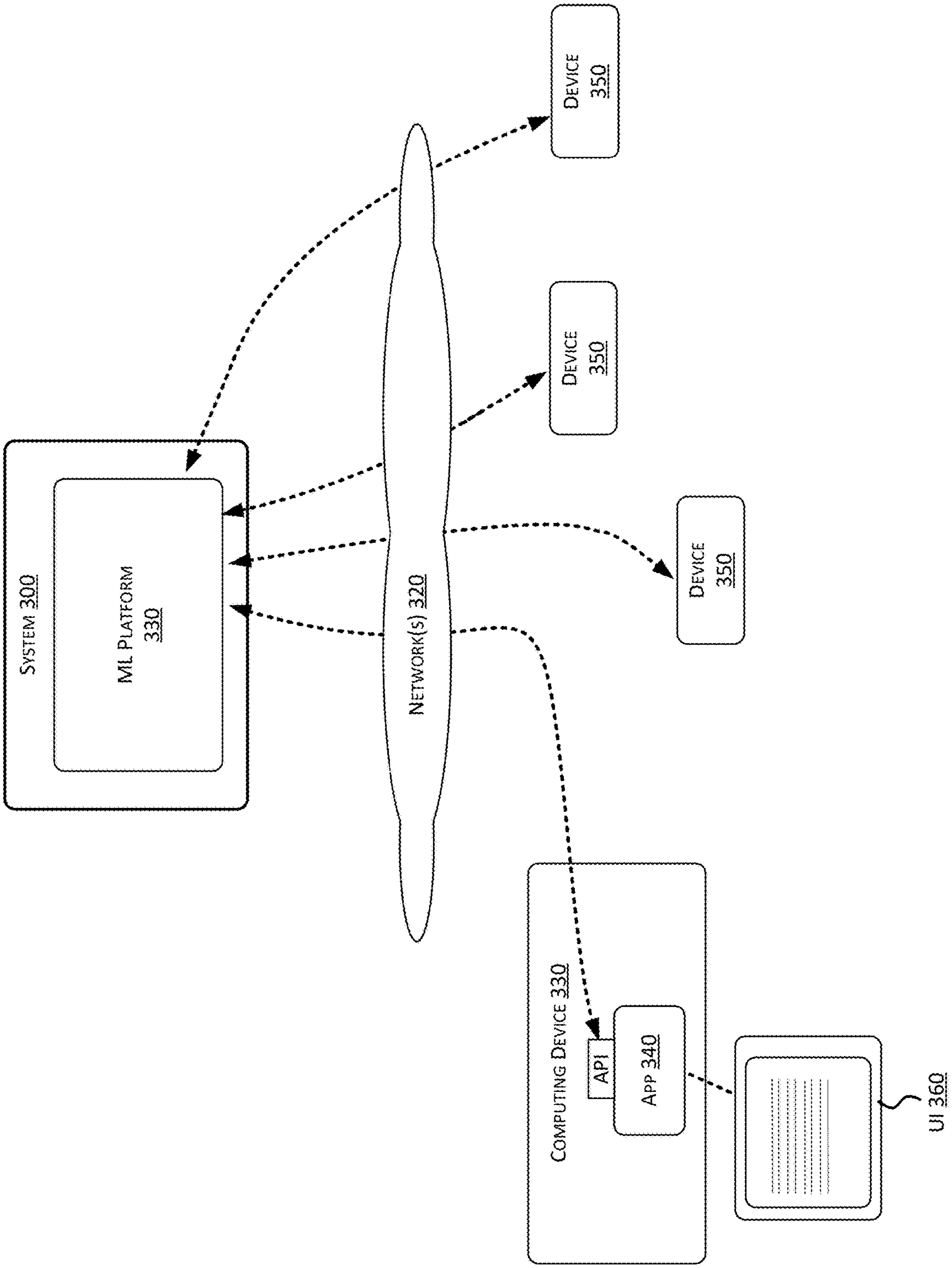
FIG. 3 is a diagram showing aspects of an example system according to one embodiment disclosed herein.

In various embodiments, machine learning model(s) may be run locally on the client. In other embodiments, machine learning inferencing can be performed on a server of a network. For example, in the system illustrated in FIG. 3, a system 300 is illustrated that implements ML platform 330. The ML platform 330 may be configured to provide output data to various devices 350 over a network 320, as well as computing device 350. A user interface 360 may be rendered on computing device 350. The user interface 360 may be provided in conjunction with an application 340 that communicates to the ML platform 330 using an API via network 320. In some embodiments, system 300 may be configured to provide issue identification information to users. In one example, ML platform 330 may implement a machine learning system to perform one or more tasks. The ML platform 330 utilizes the machine learning system to perform tasks such as root cause identification. The machine learning system may be configured to be optimized using the techniques described herein.

Figure 4:
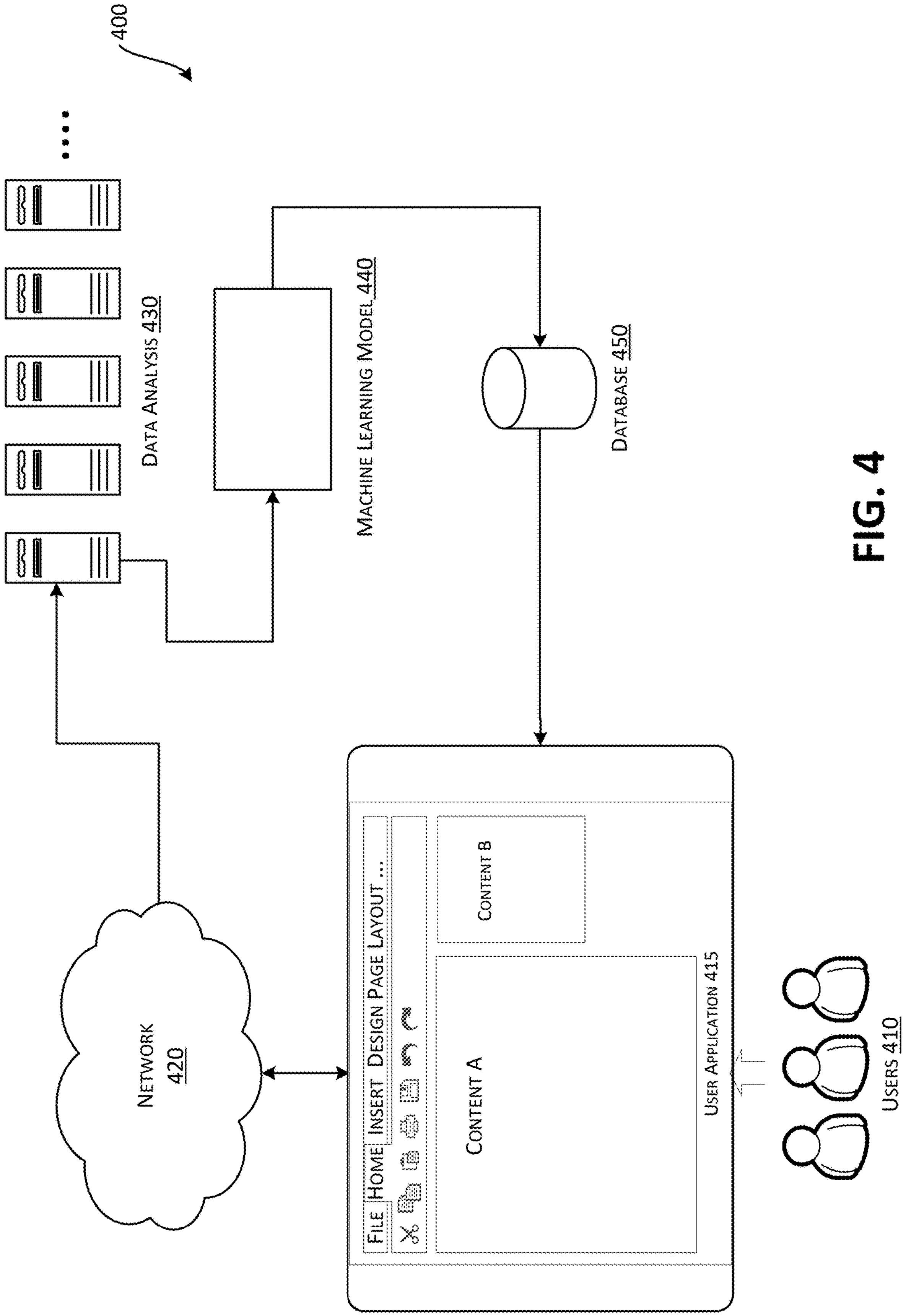
FIG. 4 is a diagram showing aspects of an example system according to one embodiment disclosed herein.

FIG. 4 is a computing system architecture diagram showing an overview of a system disclosed herein for implementing a machine learning model, according to one embodiment disclosed herein. As shown in FIG. 4, a machine learning system 400 may be configured to perform analysis and perform identification, prediction, or other functions based upon various data collected by and processed by data analysis components 430 (which might be referred to individually as an "data analysis component 430" or collectively as the "data analysis components 430"). The data analysis components 430 may, for example, include, but are not limited to, physical computing devices such as server computers or other types of hosts, associated hardware components (e.g., memory and mass storage devices), and networking components (e.g., routers, switches, and cables). The data analysis components 430 can also include software, such as operating systems, applications, and containers, network services, virtual components, such as virtual disks, virtual networks, and virtual machines. Database 450 can include data, such as a database, or a database shard (i.e., a partition of a database). Feedback may be used to further update various parameters that are used by machine learning model 420. Data may be provided to the user application 415 to provide results to various users 410 using a user application 415. In some configurations, machine learning model 440 may be configured to utilize supervised and/or unsupervised machine learning technologies. A model compression framework based on sparsity-inducing regularization optimization as disclosed herein can reduce the amount of data that needs to be processed in such systems and applications. Effective model compression when processing iterations over large amounts of data may provide improved latencies for a number of applications that use such technologies, such as image and sound recognition, recommendation systems, and image analysis.

Figure 5A:
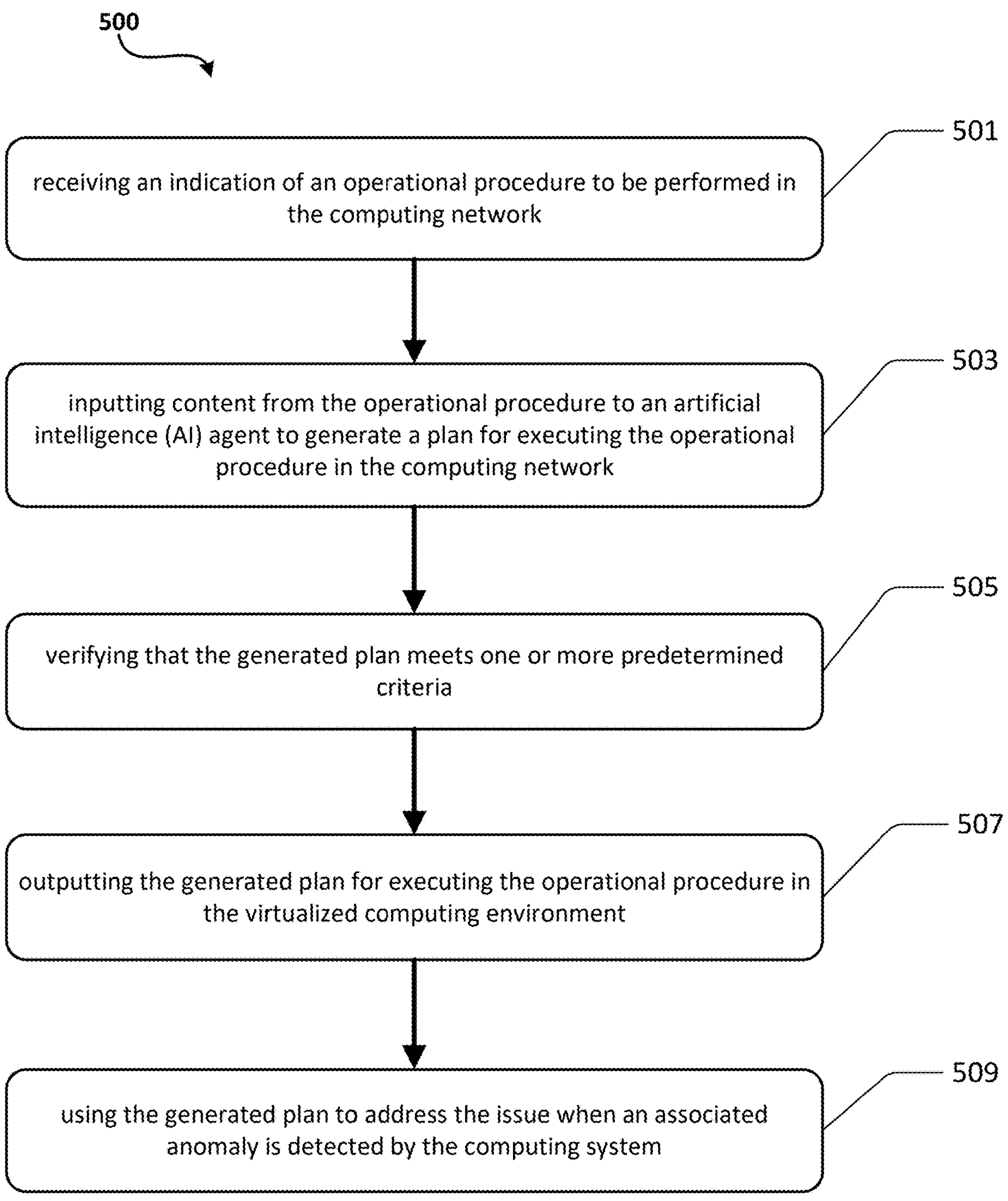
FIGS. 5A and 5B are flow diagrams showing aspects of an illustrative procedure, according to embodiments disclosed herein.

Turning now to FIG. 5A, illustrated is an example operational procedure 500 for managing a computing network implemented in a virtualized computing environment comprising a plurality of computing nodes and virtual machines or containers running of the computing nodes and implementing network functions in accordance with the present disclosure. The operational procedure may be implemented in a system comprising one or more computing devices.

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a computing device, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Referring to FIG. 5A, operation 501 illustrates receiving, by a computing system of the computing network, an indication of an operational procedure to be performed in the computing network. In an embodiment, the operational procedure is represented as a structured operator-readable document comprising operator-executable operations for resolving an issue in the computing network or implementing a modification to the computing network.

Operation 503 illustrates inputting, by the computing system, content from the operational procedure to an artificial intelligence (AI) agent to generate a plan for executing the operational procedure in the computing network. In an embodiment, the plan includes a plurality of operations and at least one network tool for executing the operations.

Operation 505 illustrates verifying that the generated plan meets one or more predetermined criteria.

Operation 507 illustrates outputting the generated plan for executing the operational procedure in the virtualized computing environment.

Operation 509 illustrates using the generated plan to address the issue when an associated anomaly is detected by the computing system.

Figure 5B:
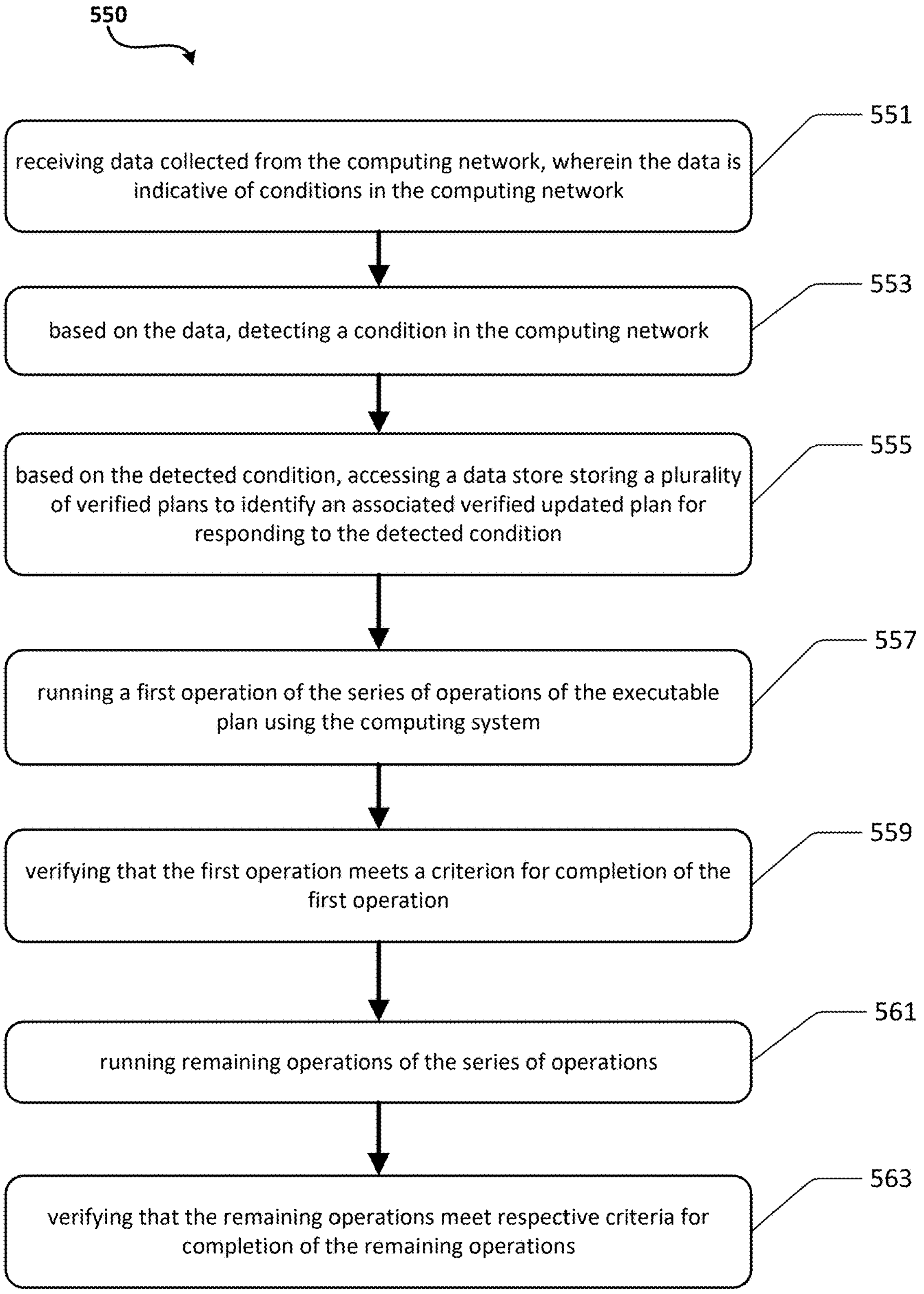

Turning now to FIG. 5B, illustrated is an example operational procedure 550 for managing a computing network implemented in a virtualized computing environment comprising a plurality of computing nodes and virtual machines or containers running of the computing nodes and implementing network functions in accordance with the present disclosure. The operational procedure may be implemented in a system comprising one or more computing devices.

Referring to FIG. 5B, operation 551 illustrates receiving data collected from the computing network. In an embodiment, the data is indicative of conditions in the computing network.

Operation 553 illustrates based on the data, detecting a condition in the computing network.

Operation 555 illustrates based on the detected condition, accessing, by the computing system, a data store storing a plurality of executable plans to identify an associated executable plan for responding to the detected condition. In an embodiment, the executable plans comprise an operational procedure to be performed in the computing network. In an embodiment, the operational procedure embodies a structured operator-readable document comprising operator-executable operations for resolving an issue in the computing network or implementing a modification to the computing network. In an embodiment, the executable plans generated by an artificial intelligence (AI) agent are based on the structured operator-readable document. In an embodiment, the executable plans comprise a series of operations that are executable by the computing system.

Operation 557 illustrates running a first operation of the series of operations of the associated executable plan using the computing system.

Operation 559 illustrates verifying that the first operation meets a criterion for completion of the first operation.

Operation 561 illustrates running remaining operations of the series of operations of the associated executable plan.

Operation 563 illustrates verifying that the remaining operations meet respective criteria for completion of the remaining operations.

In some embodiments, aspects of the present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

Figure 6:
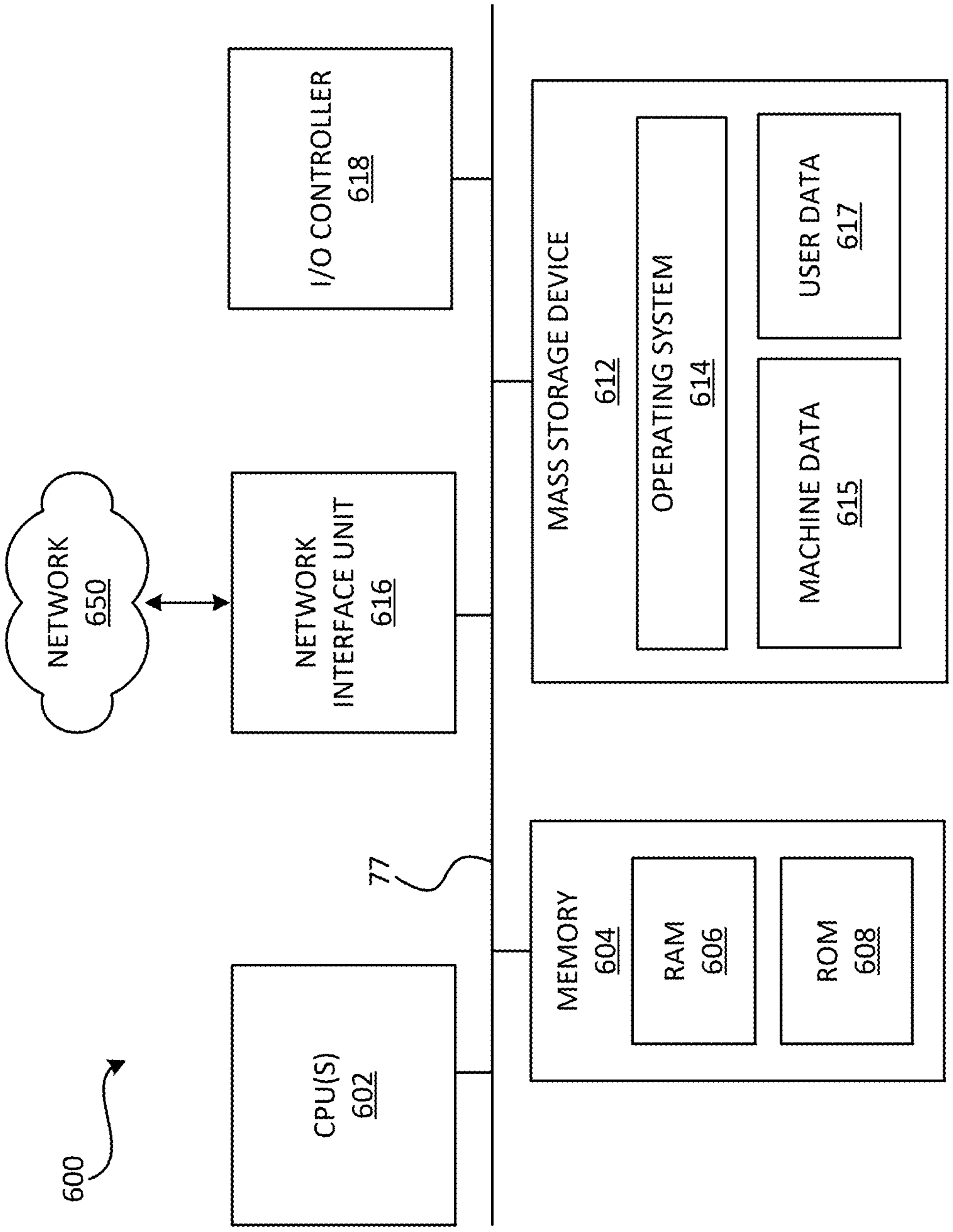
FIG. 6 is a computer architecture diagram illustrating aspects of an example computer architecture for a computer capable of executing the software components described herein.

FIG. 6 shows an example computer architecture for a computer capable of providing the functionality described herein such as, for example, a computing device configured to implement the functionality described above with reference to FIGS. 1-5. Thus, the computer architecture 600 illustrated in FIG. 6 illustrates an architecture for a server computer or another type of computing device suitable for implementing the functionality described herein. The computer architecture 600 might be utilized to execute the various software components presented herein to implement the disclosed technologies.

The computer architecture 600 illustrated in FIG. 6 includes a central processing unit 602 ("CPU"), a system memory 604, including a random-access memory 606 ("RAM") and a read-only memory ("ROM") 608, and a system bus 77 that couples the memory 604 to the CPU 602. A firmware containing basic routines that help to transfer information between elements within the computer architecture 600, such as during startup, is stored in the ROM 608. The computer architecture 600 further includes a mass storage device 612 for storing an operating system 614, other data, such as machine data 615 or user data 617.

The mass storage device 612 is connected to the CPU 602 through a mass storage controller (not shown) connected to the bus 77. The mass storage device 612 and its associated computer-readable media provide non-volatile storage for the computer architecture 600. Although the description of computer-readable media contained herein refers to a mass storage device, such as a solid-state drive, a hard disk or optical drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer-readable media.

By way of example, and not limitation, computer-readable storage media might include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of the claims, the phrase "computer storage medium," "computer-readable storage medium" and variations thereof, does not include waves, signals, and/or other transitory and/or intangible communication media, per se.

According to various implementations, the computer architecture 600 might operate in a networked environment using logical connections to remote computers through a network 650 and/or another network (not shown). A computing device implementing the computer architecture 600 might connect to the network 650 through a network interface unit 616 connected to the bus 77. It should be appreciated that the network interface unit 616 might also be utilized to connect to other types of networks and remote computer systems.

The computer architecture 600 might also include an input/output controller 618 for receiving and processing input from a number of other devices, including a keyboard, mouse, or electronic stylus (not shown in FIG. 6). Similarly, the input/output controller 618 might provide output to a display screen, a printer, or other type of output device (also not shown in FIG. 6).

It should be appreciated that the software components described herein might, when loaded into the CPU 602 and executed, transform the CPU 602 and the overall computer architecture 600 from a general-purpose computing system into a special-purpose computing system customized to facilitate the functionality presented herein. The CPU 602 might be constructed from any number of transistors or other discrete circuit elements, which might individually or collectively assume any number of states. More specifically, the CPU 602 might operate as a finite-state machine, in response to executable instructions contained within the software modules disclosed herein. These computer-executable instructions might transform the CPU 602 by specifying how the CPU 602 transitions between states, thereby transforming the transistors or other discrete hardware elements constituting the CPU 602.

Encoding the software modules presented herein might also transform the physical structure of the computer-readable media presented herein. The specific transformation of physical structure might depend on various factors, in different implementations of this description. Examples of such factors might include, but are not limited to, the technology used to implement the computer-readable media, whether the computer-readable media is characterized as primary or secondary storage, and the like. If the computer-readable media is implemented as semiconductor-based memory, the software disclosed herein might be encoded on the computer-readable media by transforming the physical state of the semiconductor memory. For example, the software might transform the state of transistors, capacitors, or other discrete circuit elements constituting the semiconductor memory. The software might also transform the physical state of such components in order to store data thereupon.

As another example, the computer-readable media disclosed herein might be implemented using magnetic or optical technology. In such implementations, the software presented herein might transform the physical state of magnetic or optical media, when the software is encoded therein. These transformations might include altering the magnetic characteristics of locations within given magnetic media. These transformations might also include altering the physical features or characteristics of locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 might include other types of computing devices, including hand-held computers, embedded computer systems, personal digital assistants, and other types of computing devices known to those skilled in the art.

It is also contemplated that the computer architecture 600 might not include all of the components shown in FIG. 6, might include other components that are not explicitly shown in FIG. 6, or might utilize an architecture completely different than that shown in FIG. 6. For example, and without limitation, the technologies disclosed herein can be utilized with multiple CPUS for improved performance through parallelization, graphics processing units ("GPUs") for faster computation, and/or tensor processing units ("TPUs"). The term "processor" as used herein encompasses CPUs, GPUs, TPUs, and other types of processors.

Figure 7:
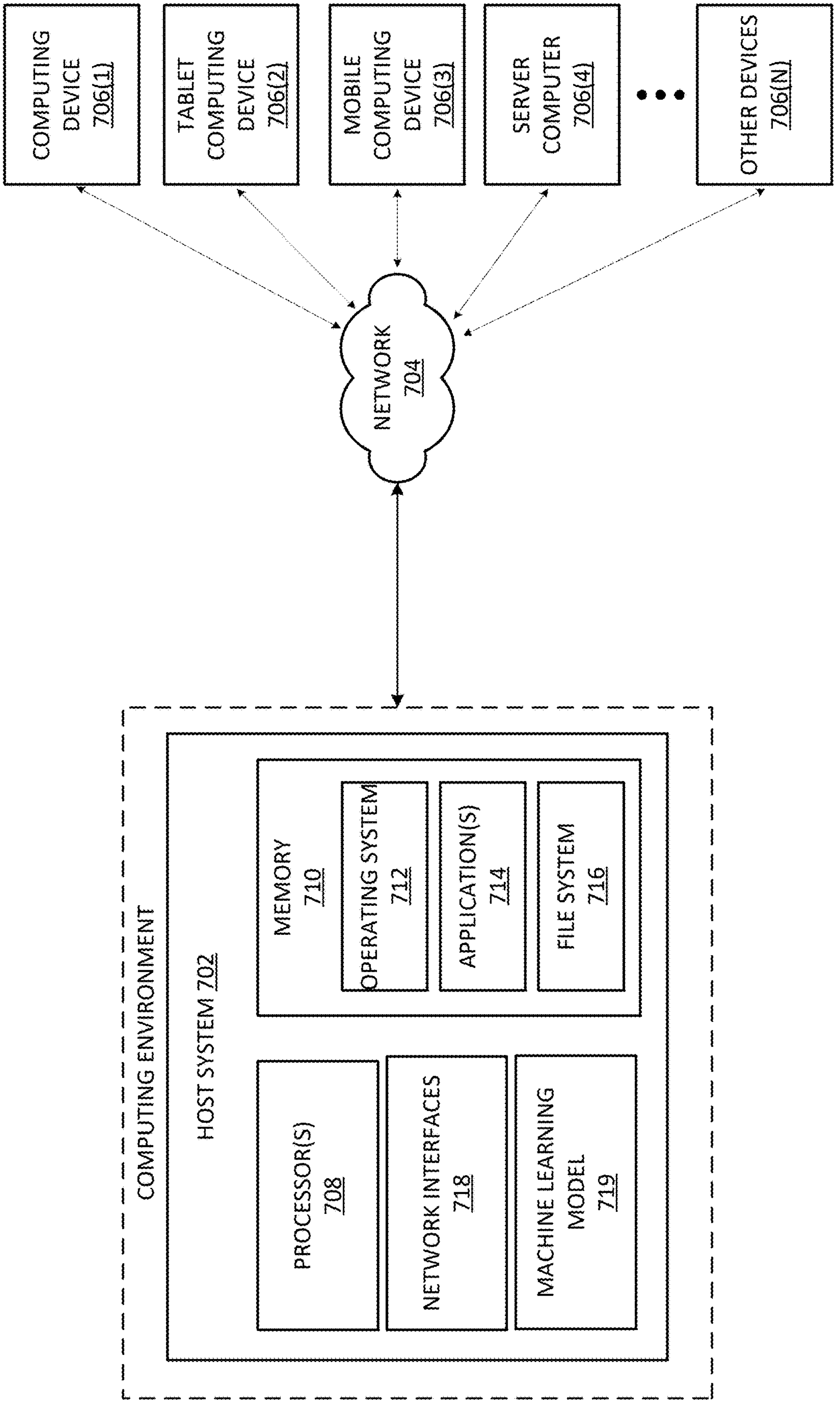
FIG. 7 is a data architecture diagram showing an illustrative example of a computer environment.

FIG. 7 illustrates an example computing environment capable of executing the techniques and processes described above with respect to FIGS. 1-6. In various examples, the computing environment comprises a host system 702. In various examples, the host system 702 operates on, in communication with, or as part of a network 704.

The network 704 can be or can include various access networks. For example, one or more client devices 706(1) . . . 706(N) can communicate with the host system 702 via the network 704 and/or other connections. The host system 702 and/or client devices can include, but are not limited to, any one of a variety of devices, including portable devices or stationary devices such as a server computer, a smart phone, a mobile phone, a personal digital assistant (PDA), an electronic book device, a laptop computer, a desktop computer, a tablet computer, a portable computer, a gaming console, a personal media player device, or any other electronic device.

According to various implementations, the functionality of the host system 702 can be provided by one or more servers that are executing as part of, or in communication with, the network 704. A server can host various services, virtual machines, portals, and/or other resources. For example, a can host or provide access to one or more portals, Web sites, and/or other information.

The host system 702 can include processor(s) 708 memory 710. The memory 710 can comprise an operating system 712, application(s) 714, and/or a file system 716. Moreover, the memory 710 can comprise the memory 604 described above with respect to FIG. 6.

The processor(s) 708 can be a single processing unit or a number of units, each of which could include multiple different processing units. The processor(s) can include a microprocessor, a microcomputer, a microcontroller, a digital signal processor, a central processing unit (CPU), a graphics processing unit (GPU), a security processor etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations based on instructions. Among other capabilities, the processor(s) may be configured to fetch and execute computer-readable instructions stored in the memory 710.

The memory 710 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PCM), static random-access memory (SRAM), dynamic random-access memory (DRAM), other types of random-access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The host system 702 can communicate over the network 704 via network interfaces 718. The network interfaces 718 can include various types of network hardware and software for supporting communications between two or more devices. The host system 702 may also include machine learning model 719.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses.

Clause 1: A method of managing a computing network implemented in a virtualized computing environment comprising a plurality of computing nodes and virtual machines or containers running of the computing nodes and implementing network functions, the method comprising:

receiving, by a computing system of the computing network, an indication of an operational procedure to be performed in the computing network, the operational procedure represented as a structured operator-readable document comprising operator-executable operations for resolving an issue in the computing network or implementing a modification to the computing network;

inputting, by the computing system, content from the operational procedure to an artificial intelligence (AI) agent to generate a plan for executing the operational procedure in the computing network, the plan including a plurality of operations and at least one network tool for executing the operations;

verifying that the generated plan meets one or more predetermined criteria;

outputting the generated plan for executing the operational procedure in the virtualized computing environment; and using the generated plan to address the issue when an associated anomaly is detected by the computing system.

Clause 2: The method of clause 1, wherein the verifying comprises comparing the generated plan to the structured operator-readable document to identify changes to the generated plan or the structured operator-readable document.

Clause 3: The method of any of clauses 1-2, further comprising iteratively updating, by a planning component, the generated plan based on the identified changes.

Clause 4: The method of any of clauses 1-3, wherein the structured operator-readable document is one of a troubleshooting guide (TSG), method of operation (MOP), run book, or play book.

Clause 5: The method of any of clauses 1-4, wherein the executable plan is generated in response to creation or modification of the structured operator-readable document.

Clause 6: The method of any of clauses 1-5, wherein the executable plan includes usage of tools that are available in the computing network.

Clause 7: The method of clauses 1-6, wherein the executable plan is represented as a flowchart including a directed graph with each node representing an action, condition, or event.

Clause 8: The method of clauses 1-7, wherein the tools comprise script tools or semantic tools.

Clause 9: The method of clauses 1-8, wherein the script tools comprise retrieval tools used to access data from external sources, or action tools used to perform actions in the computing network.

Clause 10: The method of clauses 1-9, further comprising using an AI model to perform tasks that include semantics.

Clause 11: The method of clauses 1-10, wherein the verified generated plan is run by an execution component configured to be stateful and pause and resume execution at a subsequent time.

Clause 12: A computing system, comprising:

one or more processors; and a computer-readable storage medium having computer-executable instructions stored thereupon which, when executed by the processor, cause the computing system to perform operations comprising:

receiving an indication of an operational procedure to be performed in a computing network implemented in a virtualized computing environment comprising a plurality of computing nodes and virtual machines or containers running of the computing nodes and implementing network functions, the operational procedure represented as a structured operator-readable document comprising operator-executable operations for resolving an issue in the computing network or implementing a modification to the computing network;

inputting content from the operational procedure to an artificial intelligence (AI) agent to generate a plan for executing the operational procedure in the computing network, the plan including a plurality of operations and at least one network tool for executing the operations;

verifying that the generated plan meets one or more predetermined criteria;

outputting the generated plan for executing the operational procedure in the virtualized computing environment; and using the generated plan to address the issue when an associated anomaly is detected by the computing system.

Clause 13: The computing system of clause 12, wherein the structured operator-readable document is one of a troubleshooting guide (TSG), method of operation (MOP), run book, or play book.

Clause 14: The computing system of any of clauses 12 and 13, wherein the executable plan is generated in response to creation or modification of the structured operator-readable document.

Clause 15: The computing system of any of clauses 12-14, wherein the executable plan includes usage of tools that are available in the computing network.

Clause 16: The computing system of any of clauses 12-15, wherein the executable plan is represented as a flowchart including a directed graph with each node representing an action, condition, or event.

Clause 17: The computing system of any of clauses 12-16, wherein the tools comprise script tools or semantic tools.

Clause 18: A computer-readable storage medium having computer-executable instructions stored thereupon which, when executed by a processor of a computing system, cause the computing system to perform operations comprising:

receiving an indication of an operational procedure to be performed in a computing network implemented in a virtualized computing environment comprising a plurality of computing nodes and virtual machines or containers running of the computing nodes and implementing network functions, the operational procedure represented as a structured operator-readable document comprising operator-executable operations for resolving an issue in the computing network or implementing a modification to the computing network;

inputting content from the operational procedure to an artificial intelligence (AI) agent to generate a plan for executing the operational procedure in the computing network, the plan including a plurality of operations and at least one network tool for executing the operations;

verifying that the generated plan meets one or more predetermined criteria;

outputting the generated plan for executing the operational procedure in the virtualized computing environment; and using the generated plan to address the issue when an associated anomaly is detected by the computing system.

Clause 19: The computer-readable storage medium of clause 18, wherein the generated plan is represented as a flowchart including a directed graph with each node representing an action, condition, or event.

Clause 20: The computer-readable storage medium of any of clauses 18 and 19, wherein the generated plan includes usage of tools that are available in the computing network, wherein the tools comprise script tools or semantic tools.

The disclosure presented herein also encompasses the subject matter set forth in the following clauses.

Clause 1: A method of managing a computing network implemented in a virtualized computing environment comprising a plurality of computing nodes and virtual machines or containers running of the computing nodes implementing network functions, the method comprising:

receiving, by a computing system of the computing network, data collected from the computing network, wherein the data is indicative of conditions in the computing network;

based on the data, detecting a condition in the computing network; and based on the detected condition, accessing, by the computing system, a data store storing a plurality of executable plans to identify an associated executable plan for responding to the detected condition; wherein the executable plans comprise an operational procedure to be performed in the computing network, the operational procedure embodying a structured operator-readable document comprising operator-executable operations for resolving an issue in the computing network or implementing a modification to the computing network; the executable plans generated by an artificial intelligence (AI) agent based on the structured operator-readable document, the executable plans comprising a series of operations that are executable by the computing system;

running a first operation of the series of operations of the associated executable plan using the computing system;

verifying that the first operation meets a criterion for completion of the first operation;

running remaining operations of the series of operations of the associated executable plan; and verifying that the remaining operations meet respective criteria for completion of the remaining operations.

Clause 2: The method of clause 1, further comprising performing a remedial action in response to a failure of one of the operations to meet associated criteria.

Clause 3: The method of any of clauses 1-2, wherein the computing system uses the AI agent for performing the running and verifying operations.

Clause 4: The method of any of clauses 1-3, wherein the structured operator-readable document is one of a troubleshooting guide (TSG), method of operation (MOP), run book, or play book.

Clause 5: The method of any of clauses 1-4, wherein the executable plans are generated in response to creation or modification of the structured operator-readable documents.

Clause 6: The method of any of clauses 1-5, wherein the executable plans include usage of tools that are available in the computing network.

Clause 7: The method of clauses 1-6, wherein the executable plans comprise a flowchart comprising a directed graph with each node representing an action, condition, or event.

Clause 8: The method of clauses 1-7, wherein the verifying that the first operation meets a criterion comprises verifying that a prior command was completed.

Clause 9: The method of clauses 1-8, wherein the verifying that the first operation meets a criterion comprises verifying that a browser task was completed.

Clause 10: The method of clauses 1-9, wherein the verifying that the first operation meets a criterion comprises verifying that a logical expression is satisfied.

Clause 11: A computing system, comprising:

one or more processors; and a computer-readable storage medium having computer-executable instructions stored thereupon which, when executed by the processor, cause the computing system to perform operations comprising:

receiving an indication of an operational procedure to be performed in a computing network, the operational procedure comprising a structured operator-readable document comprising operator-executable operations for resolving an issue in the computing network or implementing a modification to the computing network;

accessing a data store to identify an associated executable plan for performing the operational procedure, the executable plan generated by an AI agent based on the structured operator-readable document, the executable plan comprising a series of operations that are executable by the AI agent;

running a first operation of the series of operations of the executable plan;

verifying that the first operation meets a criterion for completion of the first operation;

running remaining operations of the series of operations; and verifying that the remaining operations meet respective criteria for completion of the remaining operations.

Clause 12: The computing system of clause 11, wherein the indication is determined by receiving data collected from the computing network, wherein the data is indicative of conditions in the computing network;

based on the data, detecting, an anomaly in the computing network; and based on the detected anomaly, accessing a data store to identify the associated executable plan for responding to the detected anomaly.

Clause 13: The computing system of any of clauses 11 and 12, wherein the structured operator-readable document is one of a troubleshooting guide (TSG), method of operation (MOP), run book, or play book.

Clause 14: The computing system of any of clauses 11-13, wherein the executable plan includes usage of tools that are available in the computing network.

Clause 15: The computing system of any of clauses 11-14, wherein the executable plan is a flowchart comprising a directed graph with each node representing an action, condition, or event.

Clause 16: The computing system of any of clauses 11-15, wherein the verifying that the first operation meets a criterion comprises verifying that a prior command was completed.

Clause 17: The computing system of any of clauses 11-16, wherein the verifying that the first operation meets a criterion comprises verifying that a browser task was completed.

Clause 18: The computing system of any of clauses 11-17, wherein the verifying that the first operation meets a criterion comprises verifying that a logical expression is satisfied.

Clause 19: A computer-readable storage medium having computer-executable instructions stored thereupon which, when executed by a processor of a computing system, cause the computing system to perform operations comprising:

receiving an indication of an operational procedure to be performed in a computing network, the operational procedure comprising a structured operator-readable document comprising operator-executable operations for resolving an issue in the computing network or implementing a modification to the computing network;

accessing a data store to identify an associated executable plan for performing the operational procedure, the executable plan generated by an AI agent based on the structured operator-readable document, the executable plan comprising a series of operations that are executable by the AI agent;

running a first operation of the series of operations of the executable plan using the AI agent;

verifying that the first operation meets a criterion for completion of the first operation;

running remaining operations of the series of operations; and verifying that the remaining operations meet respective criteria for completion of the remaining operations.

Clause 20: The computer-readable storage medium of clause 19, wherein the executable plan is a flowchart comprising a directed graph with each node representing an action, condition, or event.

The invention claimed is:

1. A method of managing a computing network implemented in a virtualized computing environment comprising a plurality of computing nodes and virtual machines or containers running on the computing nodes and implementing network functions, the method comprising:

receiving, by a computing system of the computing network, an indication of an operational procedure to be performed in the computing network, the operational procedure represented as a structured operator-readable document comprising operator-executable operations for resolving an issue in the computing network or implementing a modification to the computing network;

inputting, by the computing system, content from the operational procedure to an artificial intelligence (AI) agent to generate a plan for executing the operational procedure in the computing network, the plan including a plurality of operations and at least one network tool for executing the operations;

validating the generated plan to determine that the generated plan is executable in the computing network, including determining that execution paths described by the structured operator-readable document are represented in the generated plan and that inputs required for at least one operation of the generated plan are available from the structured operator-readable document, from an incident associated with the issue, or from another operation of the generated plan;

iteratively updating, by a planning component, the generated plan based on validation feedback generated during the validating;

outputting the updated generated plan for executing the operational procedure in the virtualized computing environment; and using the updated generated plan to address the issue when an associated anomaly is detected by the computing system.

2. The method of claim 1, wherein the validating comprises comparing the generated plan to the structured operator-readable document to identify changes to the generated plan or the structured operator-readable document.

3. The method of claim 2, wherein the validation feedback identifies the changes, wherein the iteratively updating comprises updating, the generated plan based on the identified changes.

4. The method of claim 1, wherein the structured operator-readable document is one of a troubleshooting guide (TSG), method of operation (MOP), run book, or play book.

5. The method of claim 1, wherein the generated plan is generated in response to creation or modification of the structured operator-readable document.

6. The method of claim 1, wherein the generated plan includes usage of tools that are available in the computing network.

7. The method of claim 6, wherein the tools comprise script tools or semantic tools.

8. The method of claim 1, wherein the generated plan is represented as a flowchart including a directed graph with each node representing an action, condition, or event.

9. The method of claim 7, wherein the script tools comprise retrieval tools used to access data from external sources, or action tools used to perform actions in the computing network.

10. The method of claim 1, further comprising using an AI model to perform tasks that include semantics.

11. The method of claim 1, wherein the updated generated plan is run by an execution component configured to be stateful and pause and resume execution at a subsequent time.

12. A computing system, comprising:

one or more processors; and a computer-readable storage medium having computer-executable instructions stored thereupon which, when executed by the processor, cause the computing system to perform operations comprising:

receiving an indication of an operational procedure to be performed in a computing network implemented in a virtualized computing environment comprising a plurality of computing nodes and virtual machines or containers running on the computing nodes and implementing network functions, the operational procedure represented as a structured operator-readable document comprising operator-executable operations for resolving an issue in the computing network or implementing a modification to the computing network;

inputting content from the operational procedure to an artificial intelligence (AI) agent to generate a plan for executing the operational procedure in the computing network, the plan including a plurality of operations and at least one network tool for executing the operations;

validating the generated plan to determine that the generated plan is executable in the computing network, including determining that execution paths described by the structured operator-readable document are represented in the generated plan and that inputs required for at least one operation of the generated plan are available from the structured operator-readable document, from an incident associated with the issue, or from another operation of the generated plan;

iteratively updating, by a planning component, the generated plan based on validation feedback generated during the validating;

outputting the updated generated plan for executing the operational procedure in the virtualized computing environment; and using the updated generated plan to address the issue when an associated anomaly is detected by the computing system.

13. The computing system of claim 12, wherein the structured operator-readable document is one of a troubleshooting guide (TSG), method of operation (MOP), run book, or play book.

14. The computing system of claim 12, wherein the generated plan is generated in response to creation or modification of the structured operator-readable document.

15. The computing system of claim 12, wherein the generated plan includes usage of tools that are available in the computing network.

16. The computing system of claim 15, wherein the tools comprise script tools or semantic tools.

17. The computing system of claim 12, wherein the generated plan is represented as a flowchart including a directed graph with each node representing an action, condition, or event.

18. A non-transitory computer-readable storage medium having computer-executable instructions stored thereupon which, when executed by a processor of a computing system, cause the computing system to perform operations comprising:

receiving an indication of an operational procedure to be performed in a computing network implemented in a virtualized computing environment comprising a plurality of computing nodes and virtual machines or containers running on the computing nodes and implementing network functions, the operational procedure represented as a structured operator-readable document comprising operator-executable operations for resolving an issue in the computing network or implementing a modification to the computing network;

inputting content from the operational procedure to an artificial intelligence (AI) agent to generate a plan for executing the operational procedure in the computing network, the plan including a plurality of operations and at least one network tool for executing the operations;

validating the generated plan to determine that the generated plan is executable in the computing network, including determining that execution paths described by the structured operator-readable document are represented in the generated plan and that inputs required for at least one operation of the generated plan are available from the structured operator-readable document, from an incident associated with the issue, or from another operation of the generated plan;

iteratively updating, by a planning component, the generated plan based on validation feedback generated during the validating;

outputting the updated generated plan for executing the operational procedure in the virtualized computing environment; and using the updated generated plan to address the issue when an associated anomaly is detected by the computing system.

19. The non-transitory computer-readable storage medium of claim 18, wherein the generated plan is represented as a flowchart including a directed graph with each node representing an action, condition, or event.

20. The non-transitory computer-readable storage medium of claim 18, wherein the generated plan includes usage of tools that are available in the computing network, wherein the tools comprise script tools or semantic tools.

* * * * *